United States Patent [19]

Sommer et al.

[11] Patent Number: 5,303,143
[45] Date of Patent: Apr. 12, 1994

[54] MONITORING CIRCUIT FOR A MULTIPROCESSOR MEANS OF AN APPARATUS OR OF A SYSTEM

[75] Inventors: Andres-Guenter Sommer, Fuerth; Karl Patzelt, Buckenhof, both of Fed. Rep. of Germany

[73] Assignee: Siemens Aktiengesellschaft, Munich, Fed. Rep. of Germany

[21] Appl. No.: 797,344

[22] Filed: Nov. 25, 1991

[30] Foreign Application Priority Data

Dec. 20, 1990 [DE] Fed. Rep. of Germany ....... 4041062

[51] Int. Cl.⁵ .......................... G05B 9/02; H02H 3/08
[52] U.S. Cl. .................................... 364/184; 364/131; 364/185; 361/23; 361/93
[58] Field of Search ............... 364/131, 176, 184, 185, 364/550; 371/14, 5.5, 14; 361/23, 59, 62, 93; 307/31; 378/117

[56] References Cited

U.S. PATENT DOCUMENTS

| | | | |
|---|---|---|---|
| 4,310,770 | 1/1982 | Keener et al. | 307/35 |
| 4,549,274 | 10/1985 | Lerner et al. | 364/492 |
| 4,752,698 | 6/1988 | Furuyama et al. | 307/116 |
| 4,761,705 | 8/1988 | Reeves et al. | 361/93 |
| 4,812,943 | 3/1989 | Jones et al. | 361/92 |
| 4,831,511 | 5/1989 | Hanson | 364/184 |
| 4,991,193 | 2/1991 | Cecil et al. | 378/117 |
| 5,151,855 | 9/1992 | Gray et al. | 395/750 |

FOREIGN PATENT DOCUMENTS

3706325A1  9/1988  Fed. Rep. of Germany .

Primary Examiner—Jerry Smith
Assistant Examiner—Paul Gordon
Attorney, Agent, or Firm—Hill, Steadman & Simpson

[57] ABSTRACT

Apparatus or systems have function elements, for example final control elements as motors, generators as radiation generators, control/regulating means, etc. Their function, as well as satisfying their function, are monitored by processors. In particular, reliability-relevant or safety-relevant monitorings are undertaken. A processor is disclosed which generates a malfunction signal at an output when a malfunction of a function element occurs. A monitoring circuit responds to this malfunction signal, whereupon at least the function element is switched into a quiescent condition, and all processors are switched into the identical condition.

10 Claims, 1 Drawing Sheet

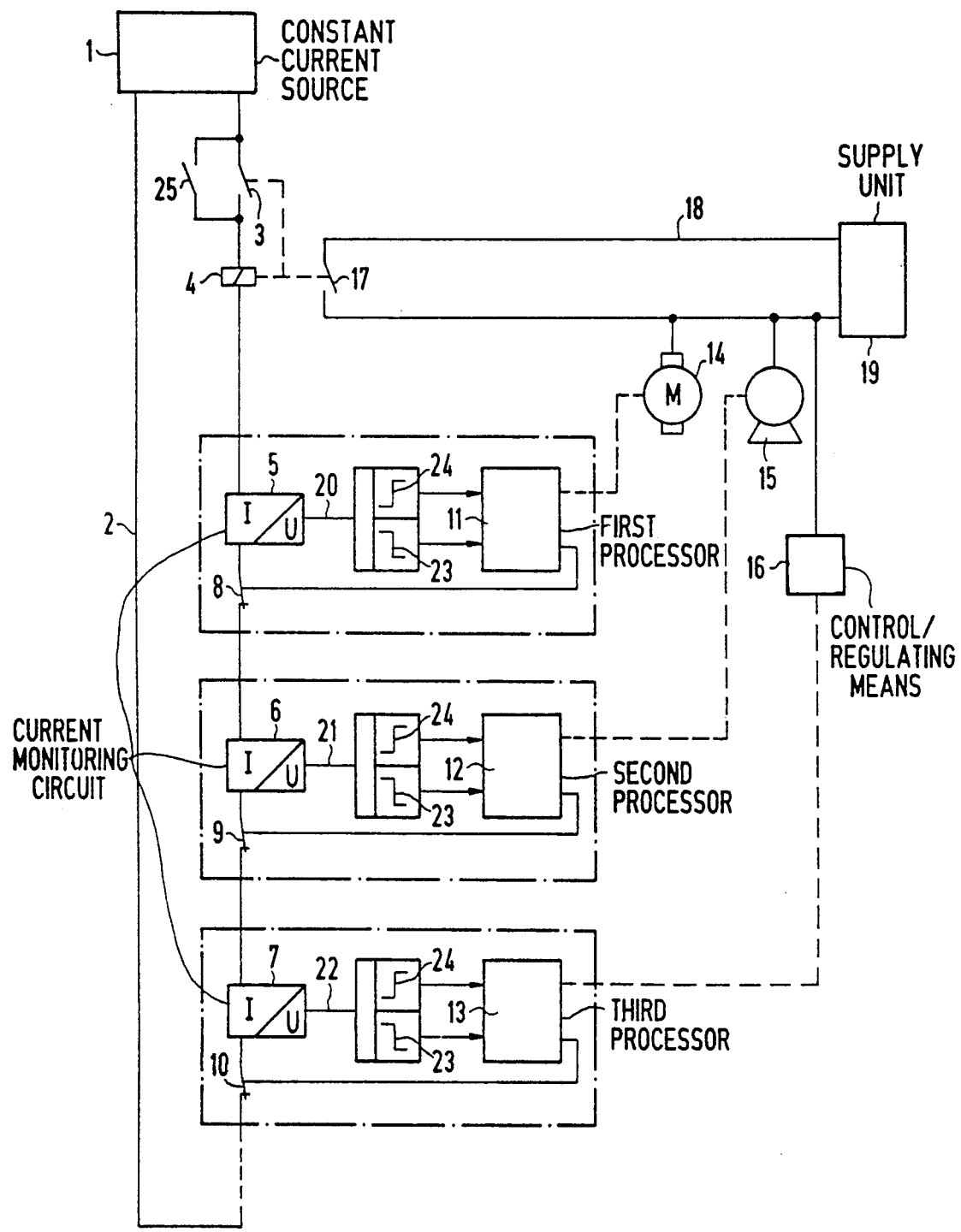

MONITORING CIRCUIT FOR A MULTIPROCESSOR MEANS OF AN APPARATUS OR OF A SYSTEM

BACKGROUND OF THE INVENTION

German Published Application 37 06 325, incorporated herein, discloses a control and data network that contains a master computer which transmits data to connector modules from which it can also receive information. Every connector module has a processor to which this data is supplied, which processes this data on the basis of a program, and which correspondingly drives an electrical means, for example a motor. The individual connector modules can be brought into an emergency stop condition by the master computer, so that the electrical devices can be brought to a standstill or into a desired condition when malfunctions or safety problems occur. Every connector module comprises a monitoring circuit responsible for this connector module that, given a faulty operation of the processor, resets it into an initial condition and informs the master computer thereof. Such a control and data network is extremely involved; moreover, there is no monitoring of the function and functionability of the electrical devices.

The invention is directed to a monitoring circuit for a multiprocessor means that is utilized in apparatus or systems in order to undertake safety-relevant or reliability-relevant monitorings. For example, the operating condition and the faultless functioning of function elements such as final control elements and generators are monitored. A reliable working of the processors is only guaranteed when all processors participating in a communication are in an identical status at a specific point in time. An appropriate monitoring is extremely involved and is undertaken such that at least two of the processors mutually monitor one another.

SUMMARY OF THE INVENTION

An object of the invention is to provide a monitoring circuit for a multiprocessor means such that this monitoring circuit is uncomplicated, given at least a same monitoring reliability.

This object is inventively achieved by a monitoring circuit for a multiprocessor means of an apparatus or of a system, whereby the apparatus or the system comprises at least one function element. At least one processor assumes a reliability-relevant monitoring of the function element, and wherein the processor produces a malfunction signal at an output given the occurrence of a malfunction of the function element. The monitoring circuit responds to the malfunction signal, and at least the function element is switched into a quiescent condition, and all processors are switched into the same condition.

An advantage of the invention is that the monitoring circuit monitors the occurrence of a malfunction signal of the existing processors. The circuit-oriented expense is low since the processors need not mutually monitor one another. Given the occurrence of a malfunction signal, at least the one function element is placed into a quiescent condition and all processors are placed into an identical condition. As a result thereof, thus a reliable working of the devices and systems is produced.

Upon occurrence of the malfunction signal, it is especially advantageous when a first signal for effecting the highest-priority interrupt and a second signal for effecting the hardware resets of all processors is generated.

An especially simple structure results when the malfunction signal switches a switch in a supervisory circuit of the monitoring circuit via a second condition for generating the first signal into the original condition for generating the second signal.

A monitoring circuit is especially insensitive to disturbance when the supervisory circuit is executed as a quiescent current circuit and whereby the malfunction signal opens a switch and the first signal is thus generated. The switch is closed for generating the second signal.

In a further development, a current monitoring circuit is advantageously provided, whereby the current monitoring circuit generates the first signal given an interruption in the current, and a subsequent detection of current generates the second signal. The sensitivity of the monitoring circuit to a disturbance is reduced since an active monitoring is thereby involved.

The monitoring circuit is employed with particular advantage when the processors monitor reliability-relevant or safety-relevant functions in a medical apparatus. Especially high demands are thus made of the reliability of the monitoring.

BRIEF DESCRIPTION OF THE DRAWING

The drawing FIGURE illustrates schematically a monitoring circuit according to the invention which monitors reliability and/or safety functions.

DESCRIPTION OF THE PREFERRED EMBODIMENTS

The Drawing FIGURE shows a monitoring circuit of a multiprocessor means as utilized, for example, in apparatus and systems for monitoring reliability-relevant or safety-relevant functions. The illustrated monitoring circuit comprises a constant current source 1 and a constant current circuit 2. A first switch 3 of a relay 4, the relay 4, first, second and third current-monitoring circuits 5, 6, 7, and first, second, and third switches 8, 9, 10 are connected in series in this constant current circuit 2. The switch 8 can be driven by a malfunction signal of a first processor 11. The second switch 9 can be driven by a malfunction signal of a second processor 12. The third switch 10 can be driven by a malfunction signal of a third processor 13. The processors 11, 12, 13 monitor the function of function elements of the apparatus or of the system such as, for example, of a motor 14 as a final control element, of an x-ray tube 15 as a radiation generator, as well as of a control/regulating means 16. The monitoring is both for functionability as well as whether the predetermined function is satisfied.

When, for example, the processor 11 that monitors the motor 14 identifies a malfunction of the motor 14, then this processor 11 generates a malfunction signal at an output, so that the switch 8 is driven and is opened in the exemplary embodiment. The constant current circuit 2 is thus interrupted, the relay 4 being switched as a result thereof. The switch 3 of the relay 4, and a further switch 17 of the relay 4 that is inserted into a safety or alarm circuit 18 with a supply unit 19 of the function elements, is thus opened. Thus, at least the motor 14 and, in the exemplary embodiment, the x-ray tube 15 as well as the control/regulating means 16 are switched into a quiescent condition. Of course, other function elements that are not shown can also be switched into the quiescent condition. The interruption of the constant current circuit 2 is detected by the current-monitoring circuits 5, 6, 7 which, in response thereto, generate a first signal 23 at their outputs 20, 21, 22 that effects the highest priority interrupt of all processors 11, 12, 13. A second signal 24 that is likewise generated by the current-monitoring circuits 5, 6, 7 due to the closing of the switches 8, 9, 10, effects a hardware reset of all processors 11, 12, 13. Given the occurrence of a malfunction, the function elements are switched into a quiescent condition and the processors 11, 12, 13 are switched into an identical condition. A forced synchronization thus occurs which guarantees a reliable operation of, for example, medical equipment. In the exemplary embodiment, the processor 12 monitors the x-ray tube 15 and the processor 13 monitors the control/-regulating means 16. Given the occurrence of a malfunction of the x-ray tube 15 and/or of the control/-regulating means 16, the above-described forced synchronization is likewise produced.

When operation is to be resumed, then a reset switch 25 which is connected parallel to the first switch 3 of the relay 4 is to be actuated. This can occur, for example, on the basis of a hardware command or of a software command that is triggered by the operator. The relay 4 is switched, so that the switch 3 and the switch 17 are closed. The monitoring circuit is thus active and the function elements assume their function.

Of course, it is also possible within the framework of the invention to provide only one current-monitoring circuit and one switch that are driven, given the occurrence of a malfunction signal of at least one processor. In an especially simple embodiment, only the malfunction signal at the output of the processors can also be monitored. Given the occurrence of a malfunction signal, the highest priority interrupt and the "hardware reset" of all processors, as well as the switching of the function elements into the quiescent condition, are then effected.

Although various minor changes and modifications might be proposed by those skilled in the art, it will be understood that we wish to include within the claims of the patent warranted hereon all such changes and modifications as reasonably come within our contribution to the art.

We claim as our invention:

1. A monitoring circuit for a system having a plurality of function elements, comprising:
   a plurality of processor means each respectively connected for monitoring a reliability or safety of a respective one of the function elements, and for generating a malfunction signal at an output thereof when a malfunction of the respective function element occurs;
   means responsive to said malfunction signal for switching all of the function elements into a quiescent condition and for also switching all of the processor means into a quiescent condition; and
   said means responsive to said malfunction signal including means connected to said processor means for generating upon occurrence of the malfunction signal a first signal for effecting a highest priority interrupt of the processor means and a second signal for effecting a hardware reset of the processor means.

2. A monitoring circuit according to claim 1 wherein said means responsive to said malfunction signal comprises a supervisory circuit, and wherein a switch means is provided in the supervisory circuit for being controlled by said malfunction signal from said processor means.

3. A monitoring circuit according to claim 2 wherein said supervisory circuit comprises a quiescent current circuit, and wherein said means connected to said processor means generates said first signal when said malfunction signal opens said switch means and which generates said second signal when said switch means is closed.

4. A monitoring circuit according to claim 3 wherein said means responsive to said malfunction signal comprises a current monitoring circuit means for generating said first signal given an interruption in current and for generating said second signal given a subsequent detection of current.

5. A monitoring circuit according to claim 4 wherein said processor means is connected to monitor reliability or safety relevant functions in a medical apparatus.

6. A monitoring circuit, comprising:
   first and second function elements connected to a power supply;
   a current source;
   a closed loop current circuit connected to said current source and formed of at least first and second series connected current monitoring circuit means for respectively monitoring currents in said current circuit, and respective first and second switches connected in series with the respective first and second monitoring circuit means;
   first processor means connected to the first current monitoring circuit means and having a malfunction signal output for activating said first switch given a malfunction of the first function element, and second processor means connected to the second monitoring circuit means and having a malfunction signal output for activating said second switch given malfunction of said second function element; and
   switch means for deactivating said power supply to said first and second function elements given a malfunction signal generated by either of said first or second processor means.

7. A monitoring circuit according to claim 6 wherein said first function element comprises an x-ray tube and said second function element comprises a motor relating to a same system in which said x-ray tube is employed.

8. A monitoring circuit according to claim 7 wherein a third current monitoring circuit means, third switch, and third processor means are provided, and wherein said third processor means is connected to detect malfunction in a control means relating to the same system as the x-ray tube and motor.

9. A monitoring circuit according to claim 6 wherein a reset switch means is provided for causing said switch means to re-establish a closed loop in said current circuit loop.

10. A monitoring circuit according to claim 6 including first and second means respectively connecting said first and second current monitoring circuit means to said respective first and second processor means, said first means detecting an interruption of current in said closed loop current circuit and for generating a first signal to effect a high priority interrupt of said first processor means and a second signal when current is again detected in said closed loop current circuit to effect a hardware reset of the first processor means, and wherein said second means upon detection of current in the current circuit loop generating a first signal to effect a high priority interrupt of said second processor means, and generating a second signal upon restoration of current in said current circuit loop to effect a hardware reset of the second processor means.

* * * * *